United States Patent
Diaz-Cuellar et al.

(10) Patent No.: US 11,861,414 B2
(45) Date of Patent: *Jan. 2, 2024

(54) TRANSFORMING SYSTEM CALLS IN A DISTRIBUTED ARCHITECTURE

(71) Applicant: MICROSOFT TECHNOLOGY LICENSING, LLC, Redmond, WA (US)

(72) Inventors: Gerardo Diaz-Cuellar, Woodinville, WA (US); Poornananda R. Gaddehosur, Redmond, WA (US); Vance P. O'Neill, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/587,611

(22) Filed: Jan. 28, 2022

(65) Prior Publication Data

US 2022/0156126 A1 May 19, 2022

Related U.S. Application Data

(63) Continuation of application No. 16/565,433, filed on Sep. 9, 2019, now Pat. No. 11,237,878.

(51) Int. Cl.
*G06F 9/50* (2006.01)
*G06F 9/455* (2018.01)
*G06F 9/54* (2006.01)

(52) U.S. Cl.
CPC ........ *G06F 9/5077* (2013.01); *G06F 9/45558* (2013.01); *G06F 9/545* (2013.01); *G06F 2009/45579* (2013.01); *G06F 2009/45587* (2013.01)

(58) Field of Classification Search
CPC ...... G06F 9/541; G06F 9/547; G06F 9/45558; G06F 2009/45579
See application file for complete search history.

(56) References Cited

U.S. PATENT DOCUMENTS

| | | | |
|---|---|---|---|
| 9,507,617 B1* | 11/2016 | Wang | G06F 9/45558 |
| 10,768,966 B1* | 9/2020 | Naenko | G06F 9/547 |
| 2013/0185474 A1* | 7/2013 | Ge | G06F 9/45533 711/6 |
| 2019/0163509 A1* | 5/2019 | Zelenov | G06F 9/45558 |
| 2020/0218560 A1* | 7/2020 | Lin | G06F 9/542 |
| 2020/0218562 A1* | 7/2020 | Wang | G06F 9/5088 |

* cited by examiner

*Primary Examiner* — Brian W Wathen
(74) *Attorney, Agent, or Firm* — Newport IP, LLC; Han K. Gim

(57) ABSTRACT

Techniques are disclosed for implementing system calls in a virtualized computing environment. An interface is configured to abstract partitions in the virtualized computing environment. A system call is received that is to be executed across a system boundary in a localized computing environment. Based on a declarative policy, one or more of a device type, device path, or process identity associated with the system call is determined. The system call is executed in the virtualized computing environment.

21 Claims, 13 Drawing Sheets

TRANSFORMING SYSTEM CALLS IN A DISTRIBUTED ARCHITECTURE

This application is a continuation of, and claims priority to, U.S. patent application Ser. No. 16/565,433, filed Sep. 9, 2019, and entitled "Transforming System Calls In A Distributed Architecture", the entire contents of which are incorporated herein by reference.

BACKGROUND

A data center is a facility that houses computer systems and various networking, storage, and other related components. Data centers may, for example, provide computing services to businesses and individuals as a remote computing service or provide "software as a service" (e.g., cloud computing).

To facilitate efficient utilization of data center resources, virtualization technologies allow a physical computing device to host one or more virtual machines (VM) that appear and operate as independent computer devices to a connected user. The data center can create, maintain or delete virtual machines in a dynamic manner. Container-based virtualization provides a lighter weight virtualization environment, improved compatibility and lower operational costs.

When enterprises expand their networks in the virtualized environment, limitations may be encountered. Many components may need to be converted in order to be migrated to the virtualized environment. In some cases, duplication of code may result, as well as inefficiencies in time and resources. The additional effort and cost may become a barrier for users to migrate their assets to the virtualized environment. For example, when enterprises attempt to replicate their networks in the virtualized environment, system calls needed to support existing code may prevent immediate expansion of their systems to the virtualized environment without significant rearchitecting and cost.

It is with respect to these considerations and others that the disclosure made herein is presented.

SUMMARY

When enterprises expand their networks into a virtualized environment, limitations may be encountered. Limitations may include, for example, different branches of code or duplication of code, and code with multiple potential entry points. A different code base may be created—a distributed one and a local-only one. Additionally, code may be difficult to prototype and validate. These issues may limit the advantage of hardware isolated distributed architectures from being used in the virtualized environment.

The disclosed embodiments describe technologies for allowing users to scale their networks to the cloud and more efficiently enable the migration of their networks from on-premises data centers to virtualized systems. In some embodiments, efficient transformation of system calls between partitions is enabled, such as from a local master-slave architecture to a hardware-isolated distributed architecture. In one embodiment, a declarative policy-driven methodology is described for converting various local architecture patterns (e.g., master-slave, controller-enforcer architectures) into a hardware-isolated distributed architecture. In one example, a master-slave pattern that crosses a user mode and kernel mode security boundary may be converted into a hardware isolated distributed boundary. This may enable faster prototyping, faster shipping of the new architecture to users, reduces the need for specific knowledge that allows developers to focus on functional logic, reduces duplicate code, reduces investment costs and increases the return on investment, and reduces the risk of diverging code bases, among other advantages.

In a master-slave, controller-enforcer architecture, techniques are described for declaring a policy and converting local device IOCTL and IRP communications. The techniques include describing the device type-path and host process identity of such communication channels, and negotiating version information across the isolation boundary. The techniques further allow:

Converting the communication to a machine to machine communication in a network

Converting the communication to a VM to VM communication on a single host

Converting the communication to a host to VM communication on a single host.

Converting the communication to a VM to host communication on a single host

Converting the conventions to a single master to multiple slave architecture.

Examples of components that can use this method of architecture conversion include, but are not limited to firewalls, IPsec, WiFi, Teredo, HNS, NAT, MBB, and IMS.

In a further embodiment, techniques are described for converting the conventions such that multiple guest partitions may use a single trusted partition for executing the system call. In one embodiment, when applications in guest partitions make a system call, the system call is intercepted and makes the call over a cross hypervisor partition transport mechanism such as, but not limited to a hyper-socket crossing a hypervisor partition. The other end of such a transport terminates at a trusted service inside a trusted root partition. In another embodiment, a designated trusted guest partition may be created that is different from an application guest partition and that is trusted and different from the root partition. The trusted service may then perform the following:

Authenticate the call as coming from a trusted guest partition.

Validate the message buffer and any data relevant for the system call

Perform the system call on behalf of the guest partition.

Return the results of such a system call back the guest partition or further processes the call such as sending the message on the wire.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
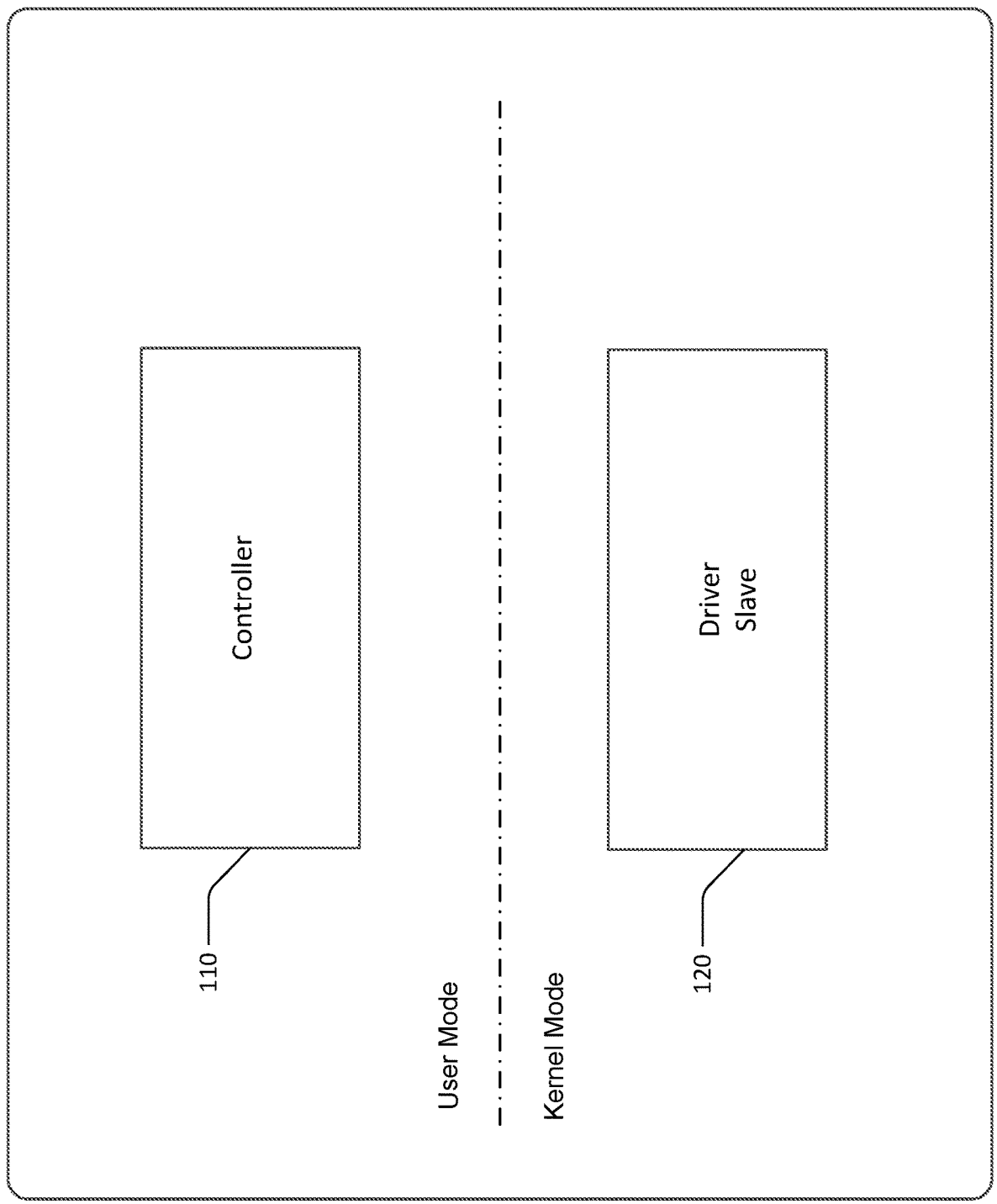
FIG. 1 is a diagram illustrating an example architecture in accordance with the present disclosure.

Described herein are methods and systems for enabling users such as enterprises to scale their networks to the cloud and more efficiently enable the migration of their networks from on-premises data centers to virtualized systems. In some embodiments, efficient transformation of system calls between partitions is enabled, such as from a local master-slave architecture to a hardware isolated distributed architecture. In many virtualized environments, a root partition may be configured with various system capabilities (e.g., networking intelligence, security) which may also be replicated in guest partitions. This may result in inefficiencies because of duplication of tasks in both the root and guest partitions. In some implementations, some functions performed in the kernel space may be invoked using system calls such as Input/Output Controls (IOCTLs) to access drivers and other functions. In some scenarios, two system calls may be generated, one in the guest partition and one in the root partition, resulting in duplicated effort.

Embodiments are disclosed for abstracting the interfaces for making system calls such that details between whether calls are made by the root partition or guest partition are abstracted. By abstracting the interfaces, instead of repeating code to implement the system calls, a cross partition system call is implemented. In one embodiment, a shim is implemented so that the system call may be agnostic as to whether it is coming from separate partitions.

In one embodiment, techniques are described for converting the conventions such that multiple guest partitions may use a single trusted partition for executing the system call. In one embodiment, when applications in guest partitions make a system call, the system call is intercepted and makes the call over a cross hypervisor partition transport mechanism such as, but not limited to a hyper-socket crossing a hypervisor partition. The other end of such a transport terminates at a trusted service inside a trusted root partition. In another embodiment, a designated trusted guest partition may be created that is different from an application guest partition and that is trusted and different from the root partition. The trusted service may then perform the following:

Authenticate the call as coming from a trusted guest partition.

Validate the message buffer and any data relevant for the system call

Perform the system call on behalf of the guest partition.

Return the results of such a system call back to the guest partition or further process the call such as sending the message on the network.

The benefits of the described techniques include but are not limited to reduced CPU cost, and the ability to perform trusted activities such as encryption on only a trusted partition and not on guest partitions. Functions that can utilize such services includes Hyper-V sockets, which is a Windows Socket with a specialized endpoint for targeting virtual machines, and environments tailored for safely running applications in isolated environments such as an isolated container.

FIG. 1 illustrates one example of a master-slave, controller-enforcer architecture that may be converted in accordance with some embodiments. In some cases, it may be desirable for one VM to be the master and other VMs to be the slaves. The master may be implemented in a highly secure VM with a secure isolation boundary. Various embodiments enable configurations and/or policies that take existing master-slave architectures and distributing the architecture requiring code changes even when the original code assumes one machine with one interface. Existing boundaries or APIs may be distributed across VMs and containers, allowing encapsulation and avoiding forking of code versions.

In some embodiments, an abstraction layer may be implemented that abstracts the details of the system call interface. This allows parsing to be performed in an isolated VM or container. For example, for Wifi controls, individual VMs may not have directed access to the access point and only the root partition does. The techniques allow for these details to be abstracted, allowing for greater coding efficiencies and enabling system optimizations such as load balancing.

Various embodiments provide a way to declare policies and convert local device IO control and IO request packet (IRP) communication. Embodiments implemented techniques for describe the device type-path and host process identity of communication channels. Further embodiments, enable negotiation of version information across the isolation boundary, conversion of the communication to a machine to machine communication in a network, conversion of the communication to a VM to VM communication on a single host, conversion of the communication to a host to VM communication on a single host, and conversion of the conventions to a single master to multiple slave architecture.

Figure 2:
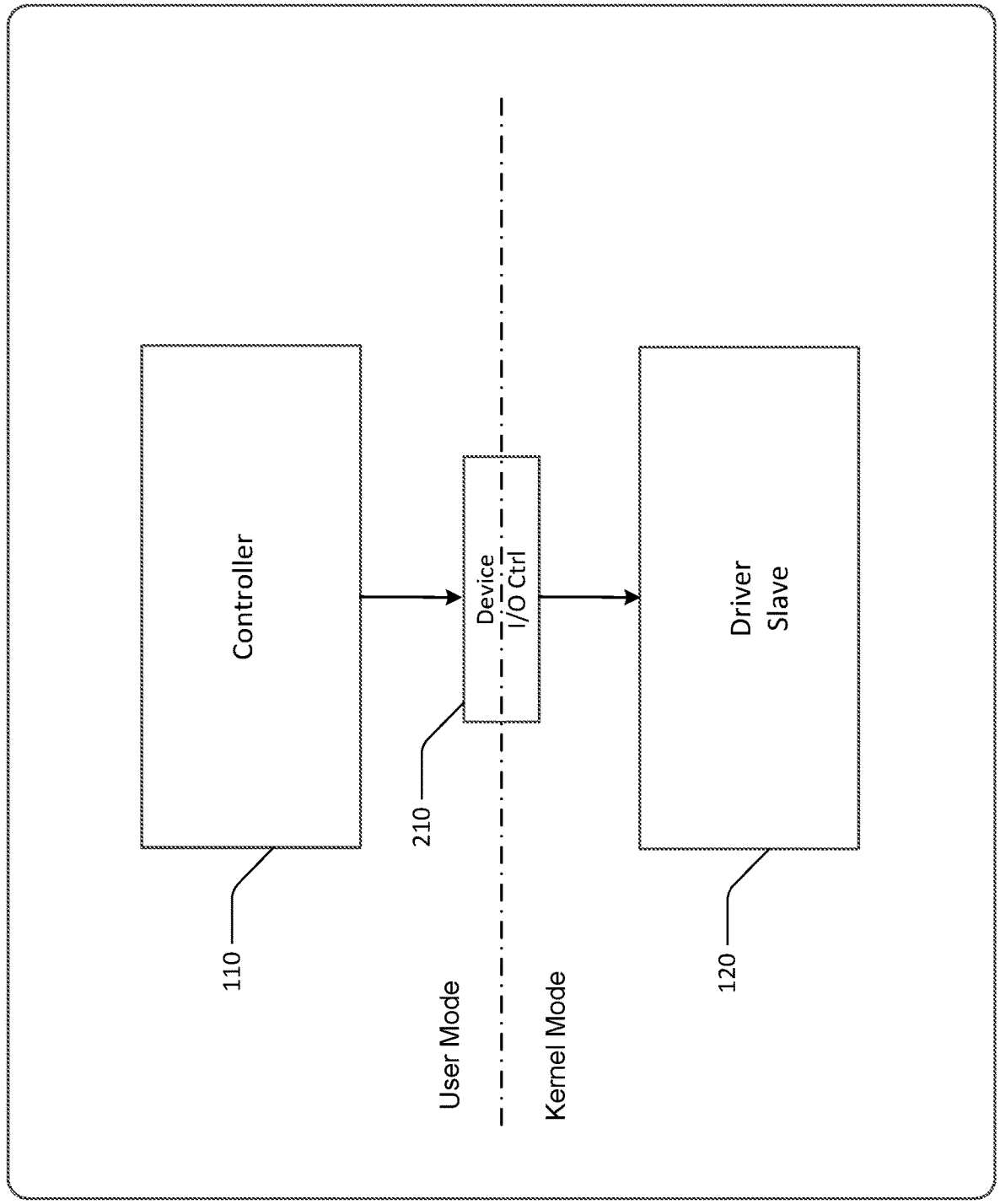
FIG. 2 is a diagram illustrating an example architecture conversion in accordance with the present disclosure.

FIG. 2 illustrates an example architecture of a master-slave or controller-slave/enforcer, including a 10 manager DeviceloCtrl( ) API 210. In one embodiment, the DeviceloCtrl API may be implemented with functionality that enables code to be agnostic of the underlying system call details. The functionality may include a policy based on device type/path and process identity that allows the scope of this communication. The policy may further specify the remote binding on which this connection should be made (across a hypervisor, across a network, across RDMA, etc.).

Figure 3:
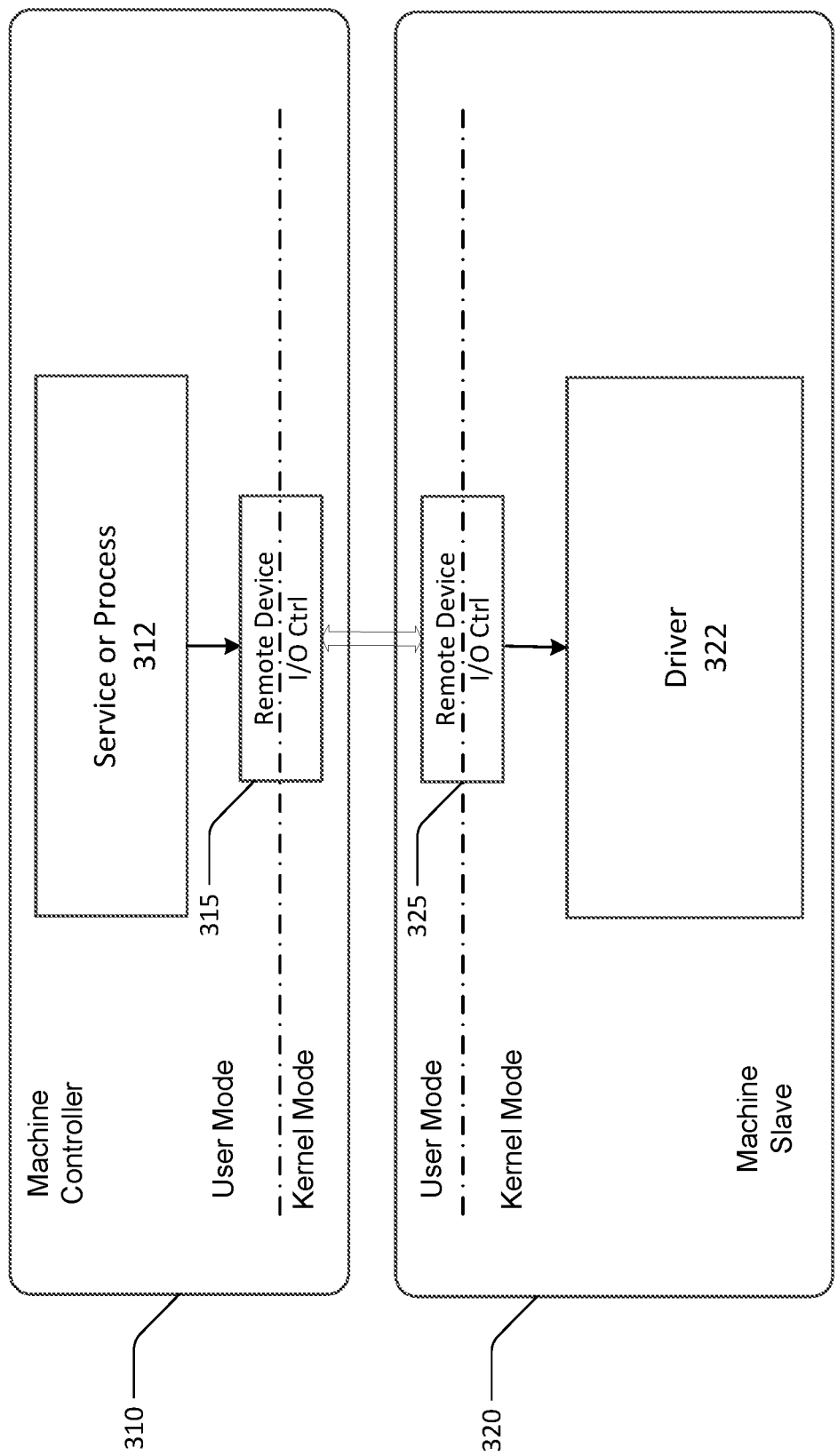
FIG. 3 is a diagram illustrating an example architecture conversion in accordance with the present disclosure.

FIG. 3 illustrates how the pattern illustrated in FIG. 2 may be transformed to a hardware isolated distributed architecture across two machines. The transport mechanism (e.g., hyperV socket) crosses partitions, and the connection may be abstracted.

Figure 4:
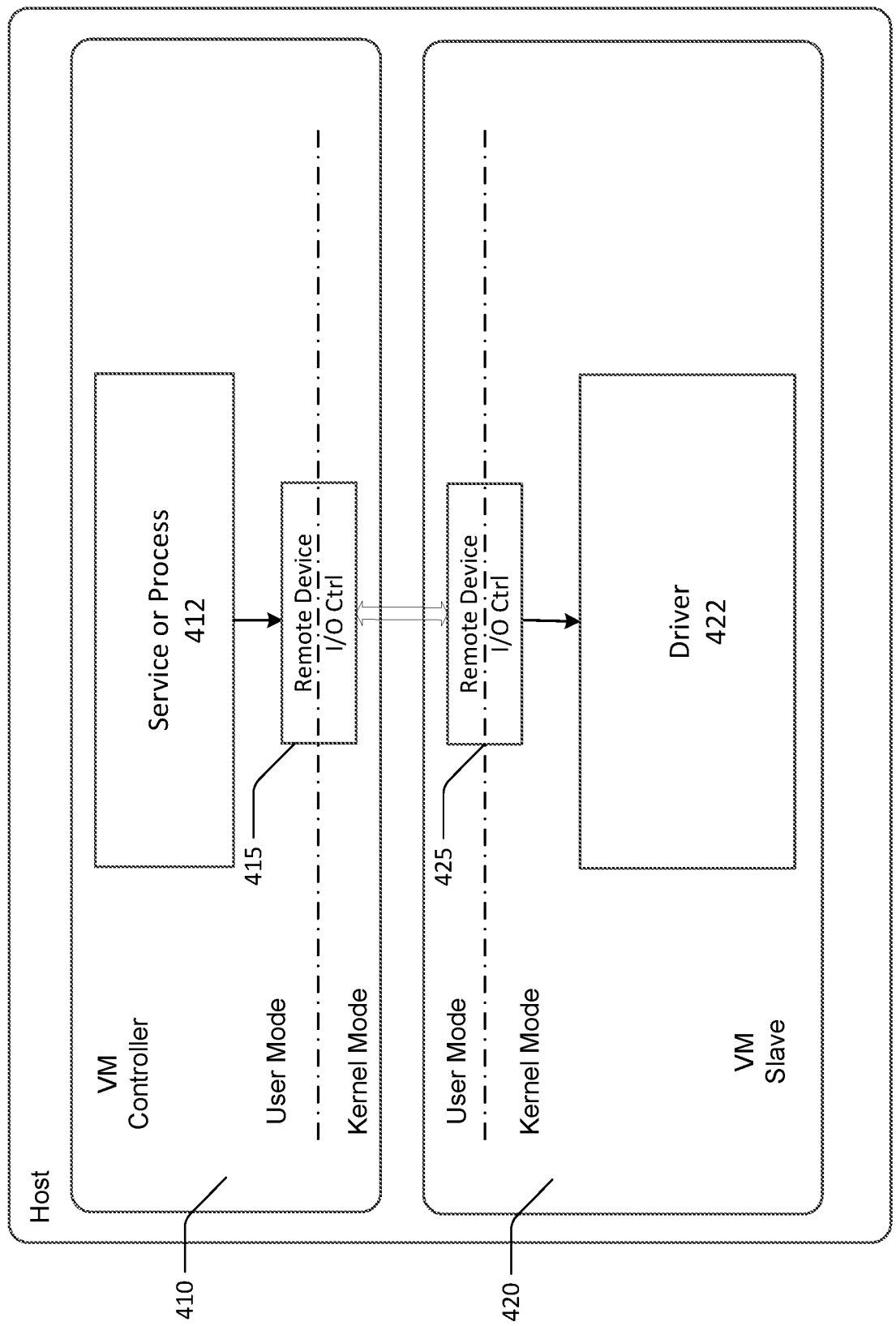
FIG. 4 is a diagram illustrating an example architecture conversion in accordance with the present disclosure.
Figure 5:
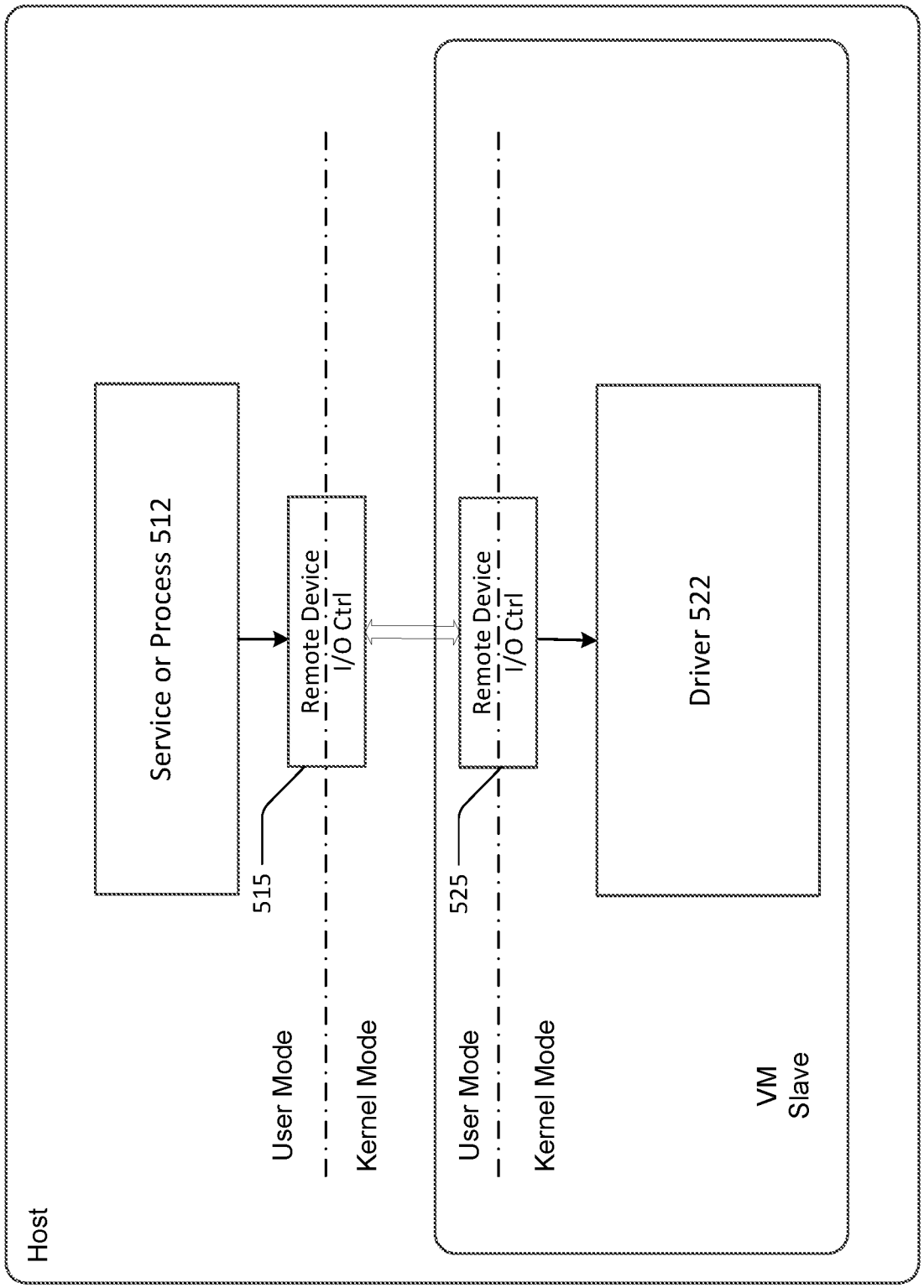
FIG. 5 is a diagram illustrating an example architecture conversion in accordance with the present disclosure.
Figure 6:
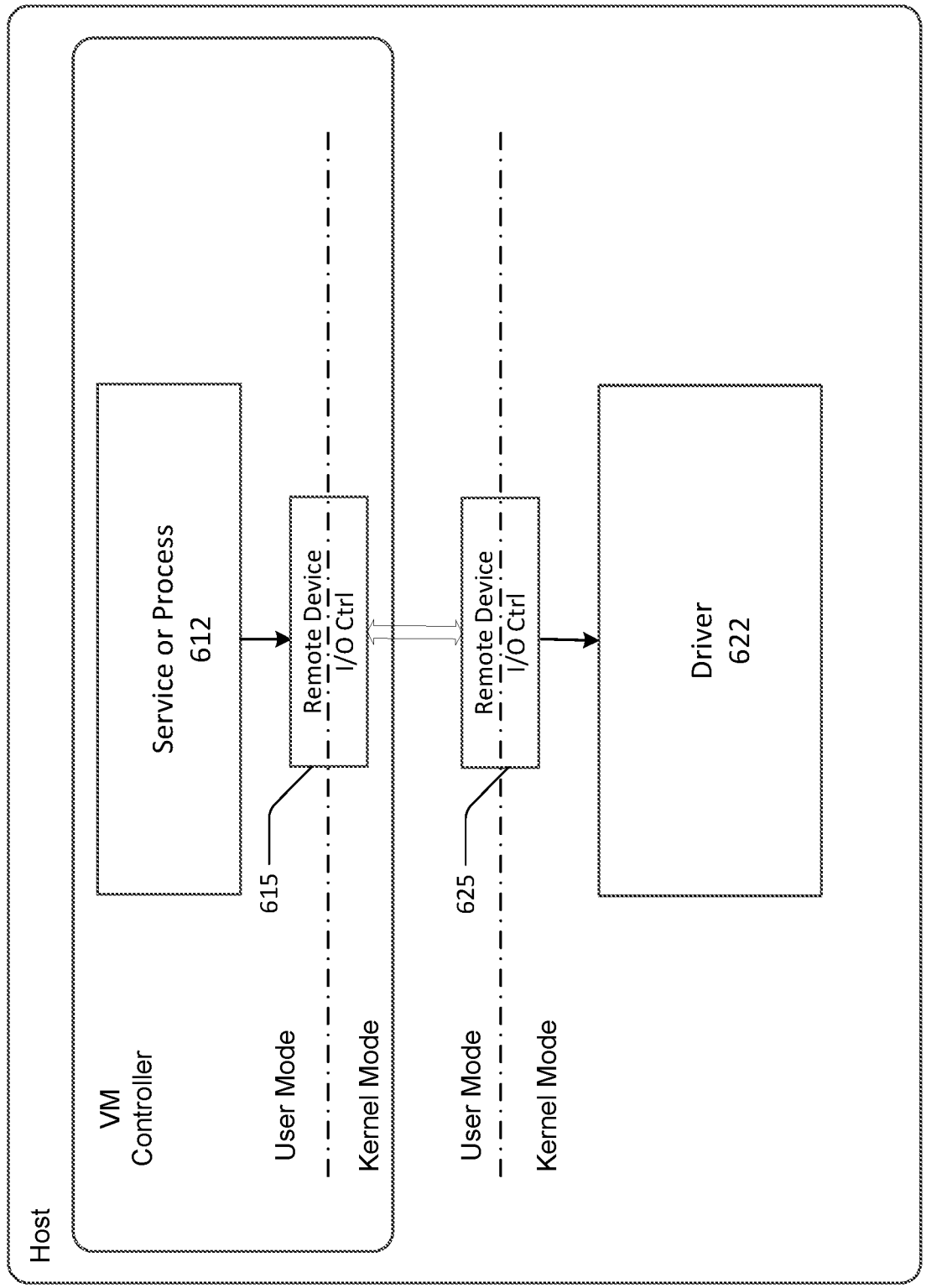
FIG. 6 is a diagram illustrating an example architecture conversion in accordance with the present disclosure.
Figure 7:
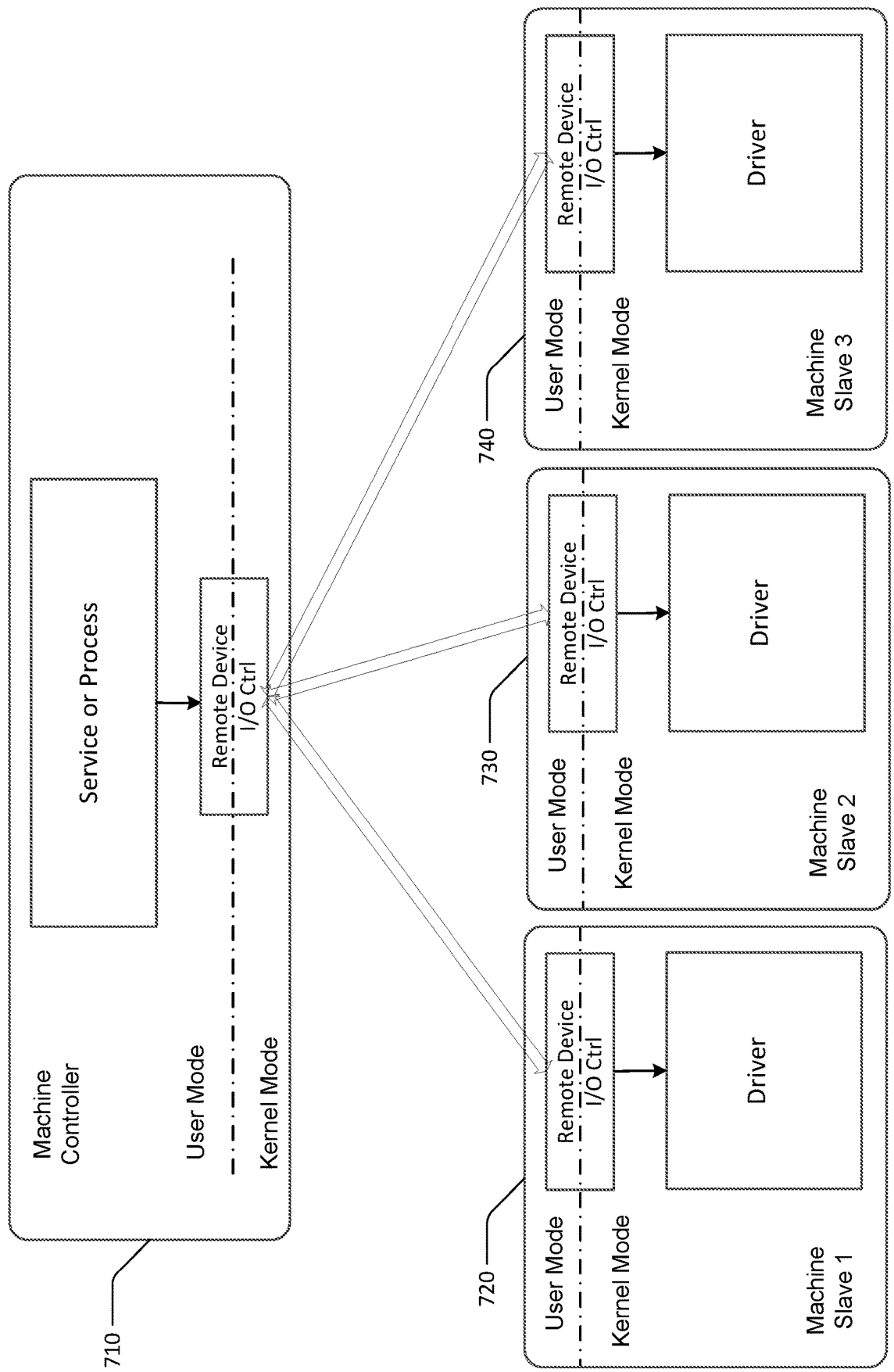
FIG. 7 is a diagram illustrating an example architecture conversion in accordance with the present disclosure.

FIG. 4 illustrates how the VM to VM communication in a single architecture can be transformed. FIG. 5 illustrates how the host to VM communication in a single host can be transformed. FIG. 6 illustrates how the VM to host communication in a single host architecture can be transformed. FIG. 7 illustrates how, with some extensions to DeviceIoCtrl and minimal error handling error cases, the architecture may be transformed to a single master/controller to multiple slave/enforcers.

In one embodiment, the above described transformations may be performed by RemoteDeviceIoCtrl changes on the DeviceIoCtrl( ) API. Additionally, one or more of the following components may be implemented:

Services or processes controller may be a user mode process that is the master or controller of the architecture.

The driver slave or driver may be a kernel component that performs the slave or enforcer functions.

DeviceIoCtrl( ). This is an example API intercept API (a single call) that performs the function of sending and receiving an input buffer, output buffer, status code, and error code, and IOCTL number.

RemoteDeviceIoCtrl( ). This component may include functionality and components, one running in the master and one running in the slave machine/VM that allows the transformation between a local master/controller—slave/enforcer architecture to a hardware isolated distributed master/controller—slave/enforcer architecture.

Machine Controller—this may be machine where the controller process is running.

Machine Slave—this component may be the machine where the slave/enforcer driver software is running.

VM Controller—The VM where the controller process is running.

VM Slave—The VM where the slave/enforcer driver software is running.

The following is one example of how a local architecture functions, and how the local architecture functions after the transformation allowed by the RemoteDeviceIoCtrl functionality.

Case 1: The master opens the slave device. The master sends a code and an input buffer. The slave processes the request and responds with an error code and output buffer. The master receives an error code and an output buffer. The master and slave continue their operation.

Case 2: The master opens the slave device. The master sends a code and input buffer and waits for the operation to complete. At a subsequent time in the future, an event occurs and the slave completes the operation (e.g., completing an IRP), and a notification is returned to the master as a completion of the call. The master receives the error code and the output buffer. The master and slave continue their operation.

With the RemoteDeviceIoCtrl functionality, a developer may configure a policy specifying: 1) The master identity, 2) the slave device type/path, 3) the remote endpoint (across a hypervisor, a network, RDMA, etc.). Once this is done the flow may be as follows:

Case 1: The master opens the slave device. RemoteDeviceIoCtrl determines that the master process identity and master device path are a match and enables remoting as specified. The master sends a code and an input buffer. RemoteDeviceIoCtrl sends the code and input buffer to the slave's remote location. The slave responds. RemoteDeviceIoCtrl sends the slave error code and output buffer back to the location of the master. The master receives an error code and an output buffer. The master and slave continue their operation.

Case 2: The master opens the slave device. RemoteDeviceIoCtrl determines that the master process identity and master device path are a match and enables remoting as specified. The master sends a code and input buffer and waits for the operation to complete. RemoteDeviceIoCtrl sends the code and input buffer to the slave's remote location. At a subsequent time in the future, an event occurs and the slave completes the operation (e.g., completing an IRP), and a notification is returned. RemoteDeviceIoCtrl sends the notification, error code, and output buffer to the master's location. The master receives the notification of the completion of the call. The master receives the error code and the output buffer. The master and slave continue their operation.

Figure 8A:
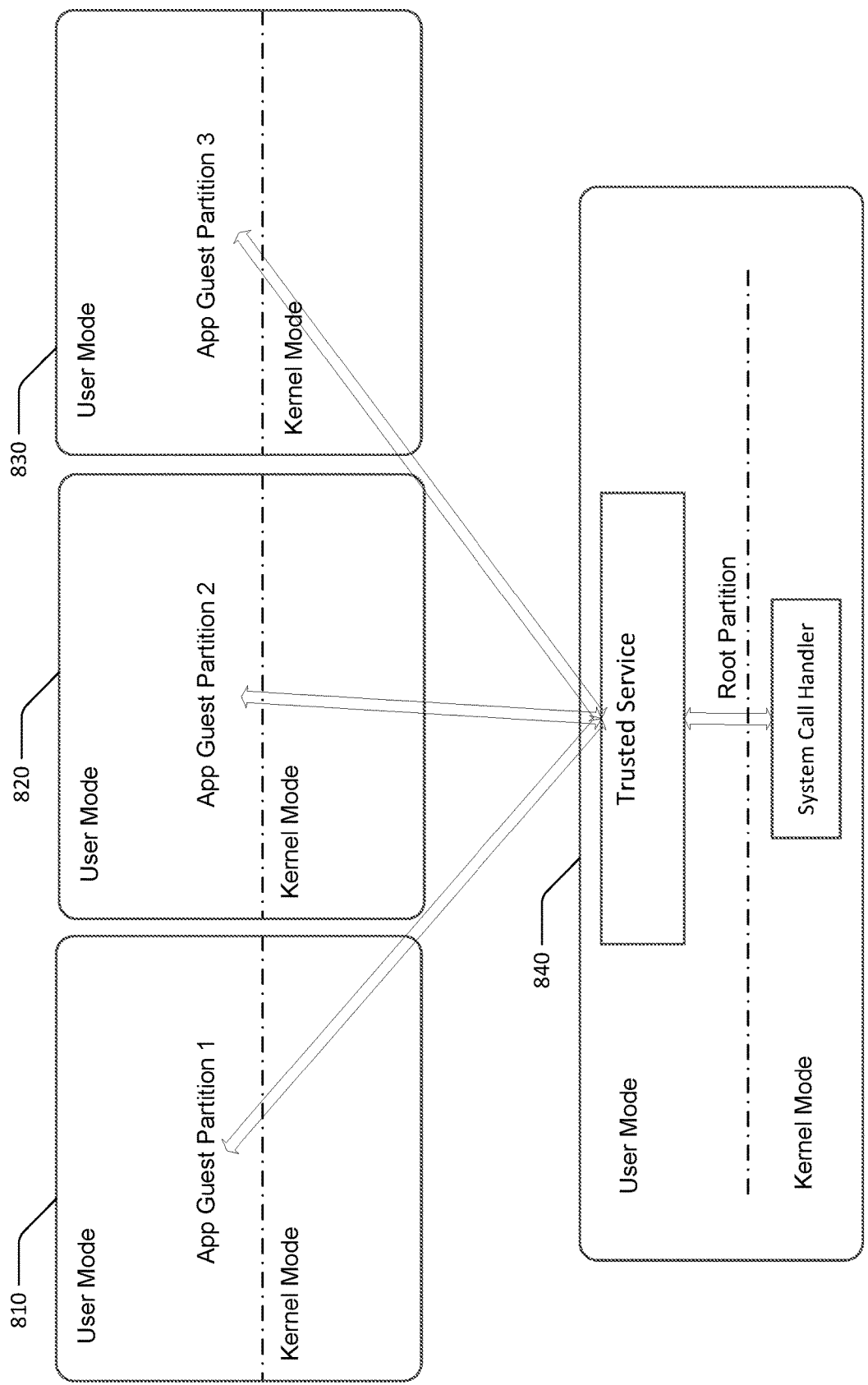
FIG. 8A is a diagram illustrating an example architecture conversion in accordance with the present disclosure.

FIG. 8A illustrates techniques for converting the conventions such that multiple guest partitions may use a single trusted partition for executing the system call. In one embodiment, when applications in guest partitions make a system call, the system call is intercepted and makes the call over a cross hypervisor partition transport mechanism such as, but not limited to a hyper-socket crossing a hypervisor partition. The other end of such a transport terminates at a trusted service inside a trusted root partition. In another embodiment, a designated trusted guest partition may be created that is different from an application guest partition and that is trusted and different from the root partition. The trusted service may then perform the following:

Authenticate the call as coming from a trusted guest partition.

Validate the message buffer and any data relevant for the system call

Perform the system call on behalf of the guest partition.

Return the results of such a system call back the guest partition or further processes the call such as sending the message on the wire.

Figure 8B:
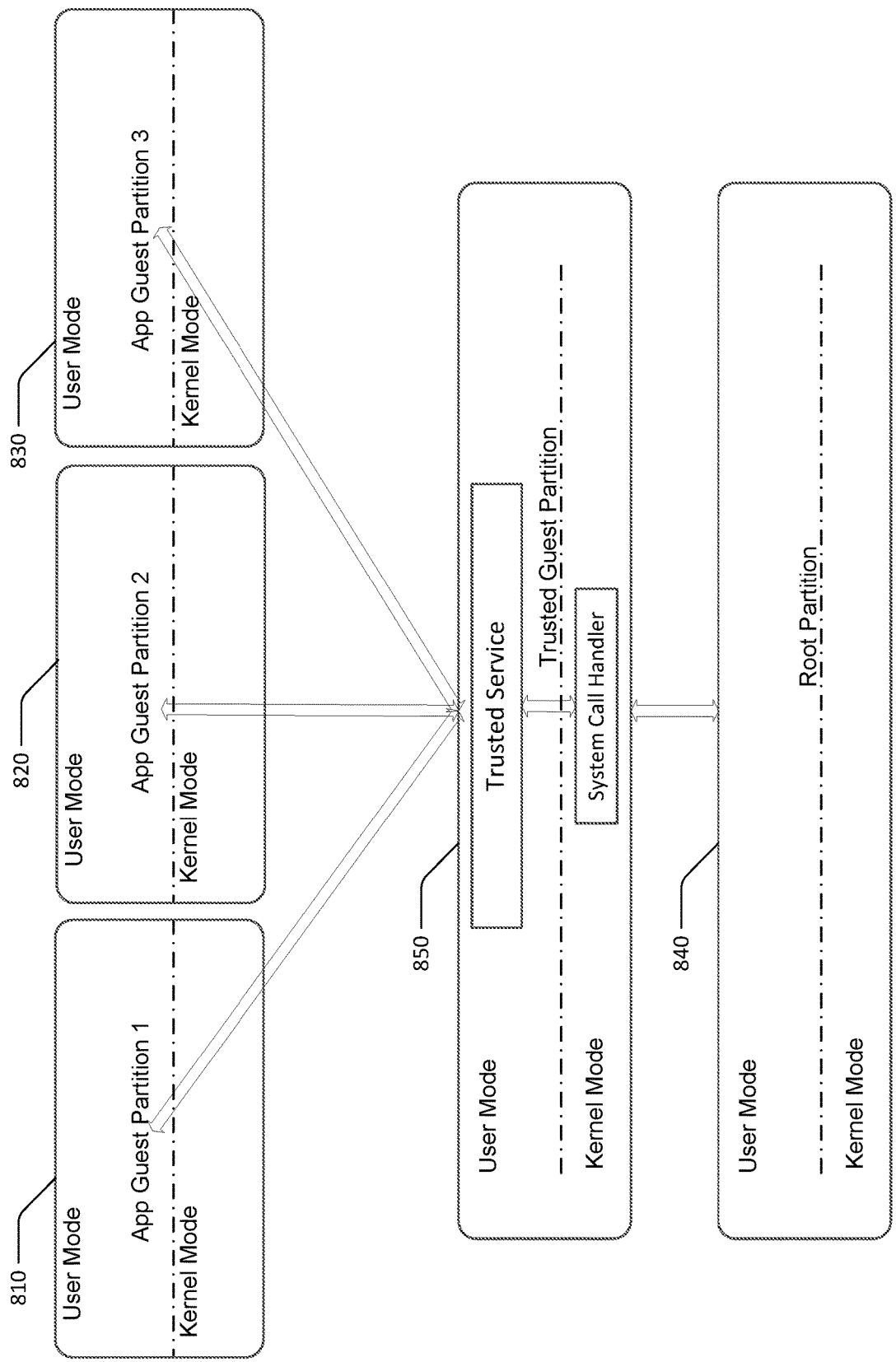
FIG. 8B is a diagram illustrating an example architecture conversion in accordance with the present disclosure.

FIG. 8B illustrates an embodiment where multiple guest partitions may use a trusted guest partition for executing the system call, and where the trusted guest partition is separate from the root partition.

Figure 9:
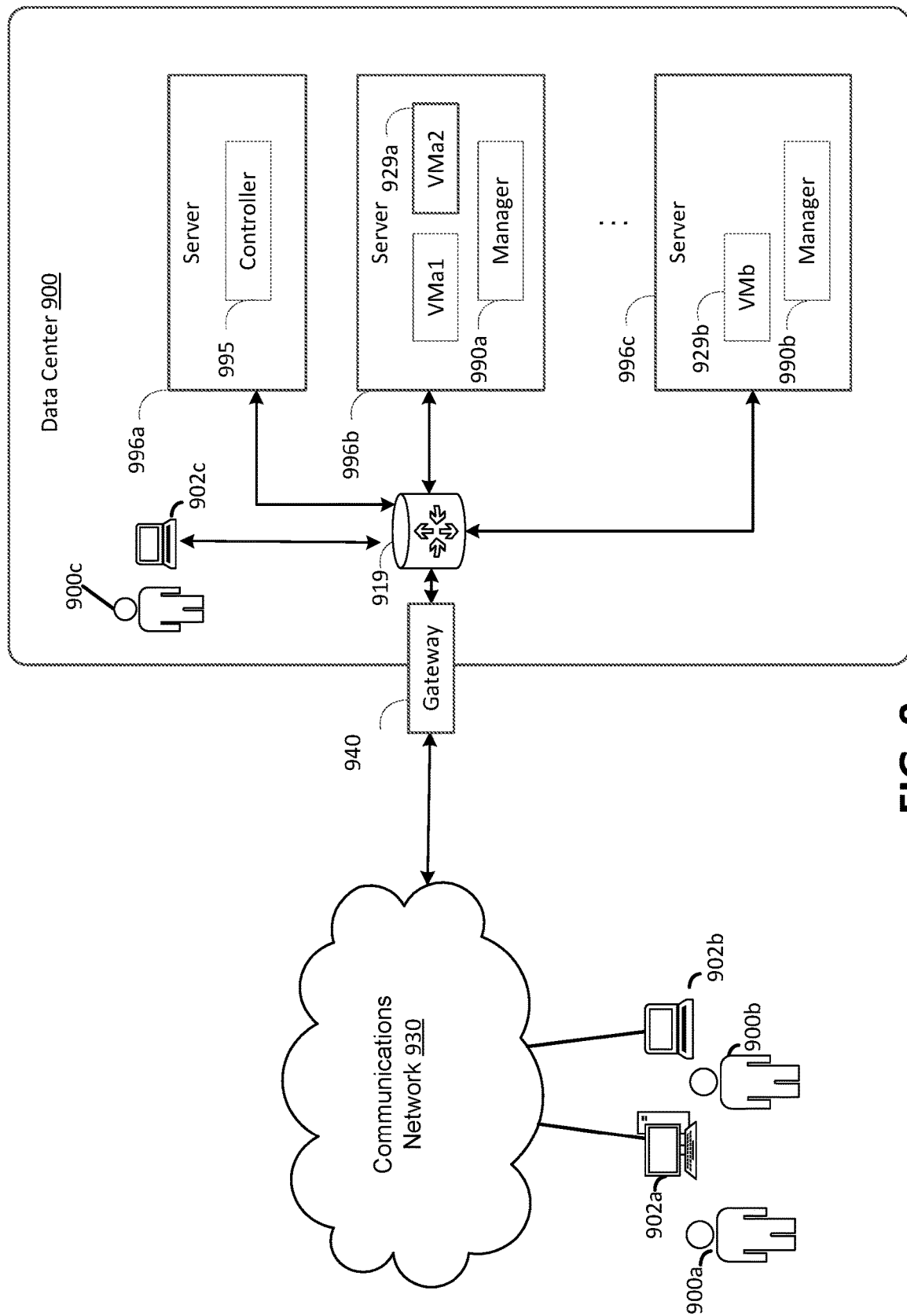
FIG. 9 is a diagram illustrating a system in accordance with the present disclosure.

FIG. 9 illustrates an example computing environment in which the embodiments described herein may be implemented. FIG. 9 illustrates a data center 900 that is configured to provide computing resources to users 900*a*, 900*b*, or 900*c* (which may be referred herein singularly as "a user 900" or in the plural as "the users 900") via user computers 902*a*, 902*b*, and 902*c* (which may be referred herein singularly as "a computer 902" or in the plural as "the computers 902") via a communications network 930. The computing resources provided by the data center 900 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 900 may include servers 996a, 996b, and 996c (which may be referred to herein singularly as "a server 996" or in the plural as "the servers 996") that provide computing resources available as virtual machines 929a and 929b (which may be referred to herein singularly as "a virtual machine 929" or in the plural as "the virtual machines 929"). The virtual machines 929 may be configured to execute applications such as Web servers, application servers, media servers, database servers, and the like. Other resources that may be provided include data storage resources (not shown on FIG. 9) and may include file storage devices, block storage devices, and the like. Servers 996 may also execute functions that manage and control allocation of resources in the data center, such as a controller 995. Controller 995 may be a fabric controller or another type of program configured to manage the allocation of virtual machines on servers 996.

Referring to FIG. 9, communications network 930 may, for example, be a publicly accessible network of linked networks and may be operated by various entities, such as the Internet. In other embodiments, communications network 930 may be a private network, such as a corporate network that is wholly or partially inaccessible to the public.

Communications network 930 may provide access to computers 902. Computers 902 may be computers utilized by users 900. Computer 902a, 902b or 902c may be a server, a desktop or laptop personal computer, a tablet computer, a smartphone, a set-top box, or any other computing device capable of accessing data center 900. User computer 902a or 902b may connect directly to the Internet (e.g., via a cable modem). User computer 902c may be internal to the data center 900 and may connect directly to the resources in the data center 900 via internal networks. Although only three user computers 902a, 902b, and 902c are depicted, it should be appreciated that there may be multiple user computers.

Computers 902 may also be utilized to configure aspects of the computing resources provided by data center 900. For example, data center 900 may provide a Web interface through which aspects of its operation may be configured through the use of a Web browser application program executing on user computer 902. Alternatively, a stand-alone application program executing on user computer 902 may be used to access an application programming interface (API) exposed by data center 900 for performing the configuration operations.

Servers 996 may be configured to provide the computing resources described above. One or more of the servers 996 may be configured to execute a manager 920a or 920b (which may be referred herein singularly as "a manager 920" or in the plural as "the managers 920") configured to execute the virtual machines. The managers 920 may be a virtual machine monitor (VMM), fabric controller, or another type of program configured to enable the execution of virtual machines 929 on servers 996, for example.

It should be appreciated that although the embodiments disclosed above are discussed in the context of virtual machines, other types of implementations can be utilized with the concepts and technologies disclosed herein.

In the example data center 900 shown in FIG. 9, a network device 929 may be utilized to interconnect the servers 996a and 996b. Network device 929 may comprise one or more switches, routers, or other network devices. Network device 929 may also be connected to gateway 940, which is connected to communications network 930. Network device 929 may facilitate communications within networks in data center 900, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 9 has been greatly simplified and that many more networks and networking devices may be utilized to interconnect the various computing systems disclosed herein. These network topologies and devices should be apparent to those skilled in the art.

It should also be appreciated that data center 900 described in FIG. 9 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 10:
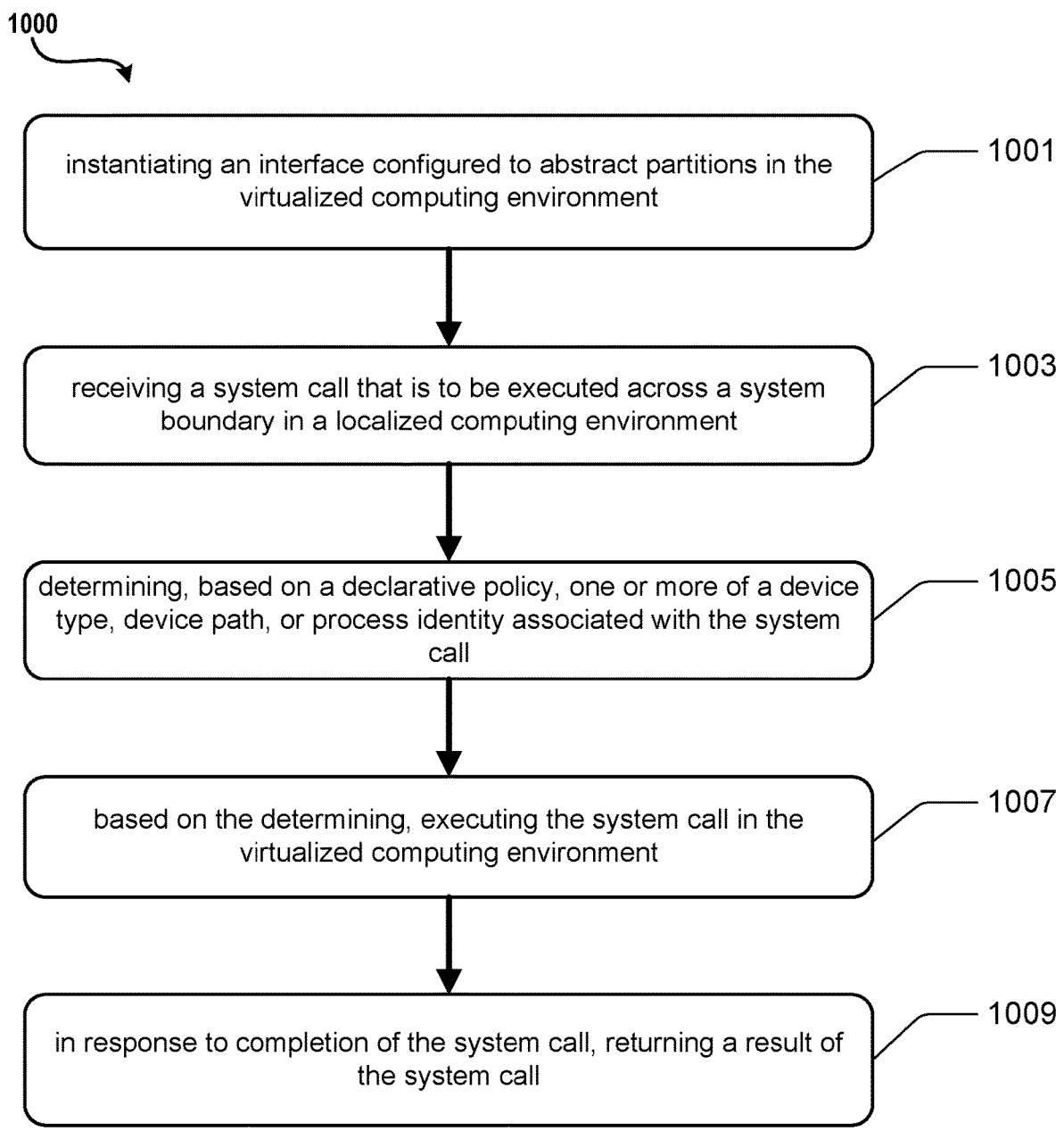
FIG. 10 is a flowchart depicting an example procedure for implementing conversion techniques in accordance with the present disclosure.

Turning now to FIG. 10, illustrated is an example operational procedure for implementing system calls in a virtualized computing environment comprising a plurality of computing devices that are configured to host a plurality of virtual machines in accordance with the present disclosure. The operational procedure may be implemented in a system comprising one or more computing devices. Referring to FIG. 10, operation 1001 illustrates instantiating an interface configured to abstract partitions in the virtualized computing environment.

Operation 1001 may be followed by operation 1003. Operation 1003 illustrates receiving, by the interface, a system call that is to be executed across a system boundary in a localized computing environment.

Operation 1003 may be followed by operation 1005. Operation 1005 illustrates determining, by the interface based on a declarative policy, one or more of a device type, device path, or process identity associated with the system call.

Operation 1005 may be followed by operation 1007. Operation 1007 illustrates based on the determining, executing the system call in the virtualized computing environment.

Operation 1007 may be followed by operation 1009. Operation 1009 illustrates in response to completion of the system call, returning a result of the system call. In an embodiment, the system call is a I/O control code or I/O request packet.

In an embodiment, the first and second thresholds are determined based on performance parameters of the virtualized computing environment.

In an embodiment, the partitions include a root partition and a guest partition.

In an embodiment, the system boundary includes a user mode and a kernel mode boundary.

In an embodiment, version information is negotiated across the system boundary.

In an embodiment, the system call is converted to a machine-to-machine communication in the virtualized computing environment.

In an embodiment, the system call is converted to a virtual machine-to-virtual machine communication on a single host in the virtualized computing environment.

In an embodiment, the system call is converted to a host-to-virtual machine communication on a single host in the virtualized computing environment.

In an embodiment, the system call is converted to a single master to multiple slave architecture in the virtualized computing environment.

In an embodiment, the results include an error code and an output buffer.

In an embodiment, the system call is converted such that multiple partitions use a single trusted partition for executing the system call in the virtualized computing environment.

In an embodiment, the trusted partition is a trusted root partition.

In an embodiment, the trusted partition is a trusted guest partition.

In an embodiment, the system call is executed in a trusted service in the trusted partition, wherein the trusted service:

authenticates the call as coming from a trusted guest partition;

validates a message buffer and data applicable to the system call; and executes the system call on behalf of the guest partition.

Figure 11:
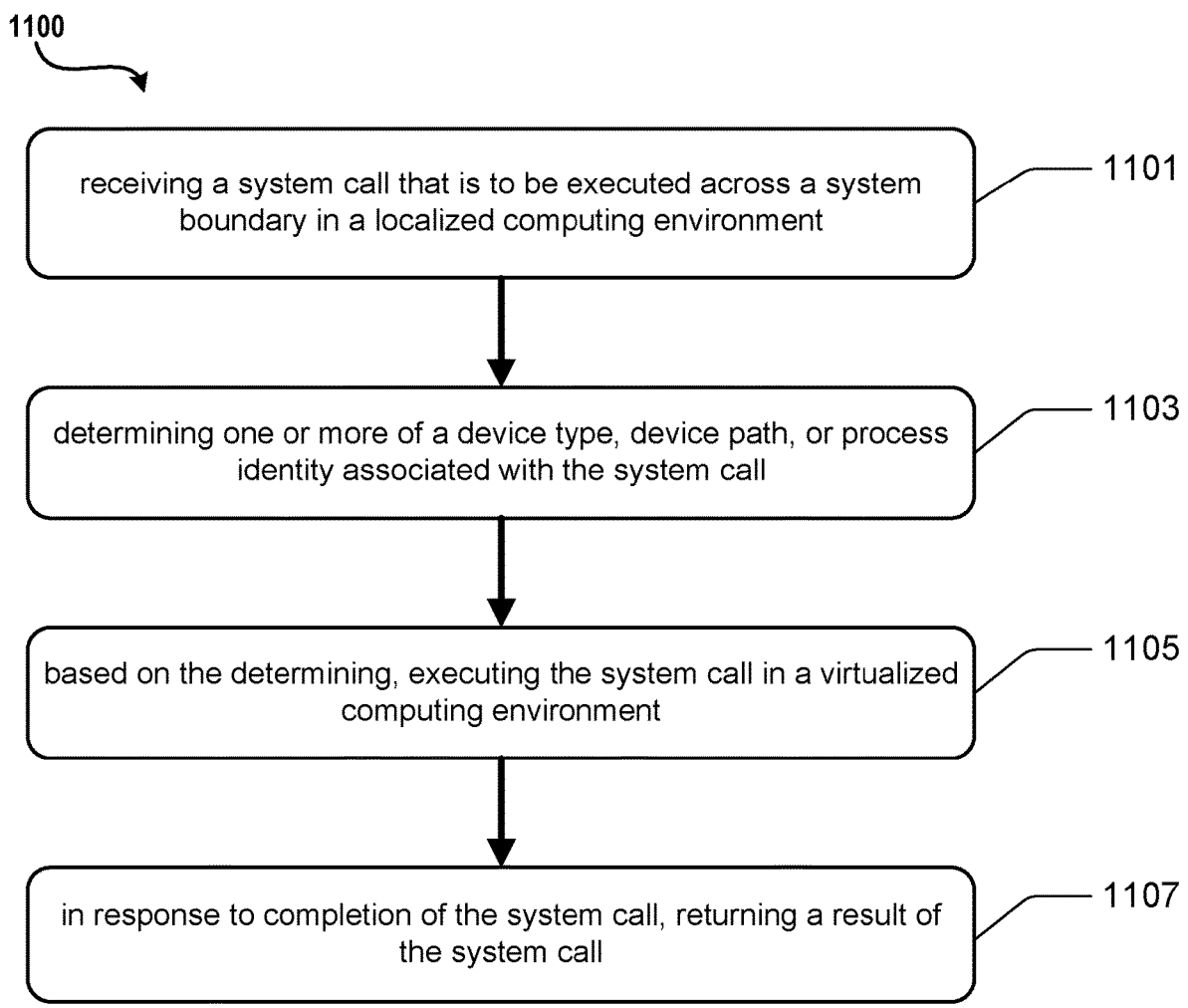
FIG. 11 is a flowchart depicting an example procedure for implementing conversion techniques in accordance with the present disclosure.

Referring to FIG. 11, illustrated is another example operational procedure for implementing system calls in a virtualized computing environment comprising a plurality of computing devices that are configured to host a plurality of virtual machines. The operational procedure may be implemented in a system comprising one or more computing devices. Referring to FIG. 11, operation 1101 illustrates receiving a system call that is to be executed across a system boundary in a localized computing environment.

Operation 1101 may be followed by operation 1103. Operation 1103 illustrates determining one or more of a device type, device path, or process identity associated with the system call.

Operation 1103 may be followed by operation 1105. Operation 1105 illustrates based on the determining, executing the system call in a virtualized computing environment.

Operation 1105 may be followed by operation 1107. Operation 1107 illustrates in response to completion of the system call, returning a result of the system call.

Operation 1109 may be followed by operation 1111. Operation 1111 illustrates instantiating additional spoke virtual networks and connecting them to the virtual hub network until a number of spoke virtual networks reaches a second threshold or the nodes and interconnections in the mesh network topology are allocated.

In an embodiment, the system call is executed across at least two partitions in the virtualized computing environment.

In an embodiment, the system call is a master-slave call.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

Networks established by or on behalf of a user to provide one or more services (such as various types of cloud-based computing or storage) accessible via the Internet and/or other networks to a distributed set of clients may be referred to as a service provider. Such a network may include one or more data centers such as data center 100 illustrated in FIG. 1, which are configured to host physical and/or virtualized computer servers, storage devices, networking equipment and the like, that may be used to implement and distribute the infrastructure and services offered by the service provider.

Figure 12:
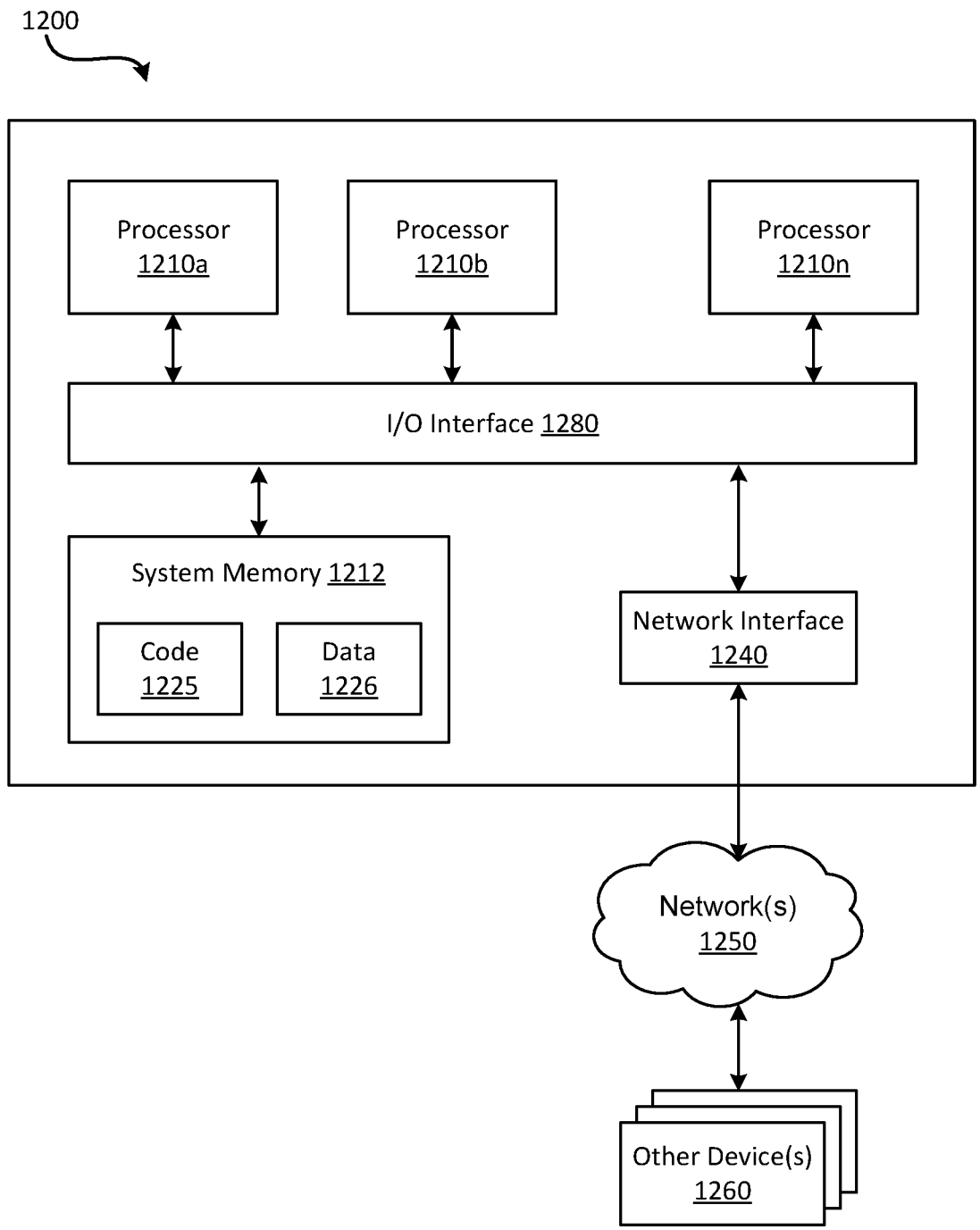
FIG. 12 is an example computing device in accordance with the present disclosure.

In some embodiments, a server that implements a portion or all of one or more of the technologies described herein, including the techniques to implement the capturing of network traffic may include a general-purpose computer system that includes or is configured to access one or more computer-accessible media. FIG. 12 illustrates such a general-purpose computing device 1200. In the illustrated embodiment, computing device 1200 includes one or more processors 1210a, 1210b, and/or 1210n (which may be referred herein singularly as "a processor 1210" or in the plural as "the processors 1210") coupled to a system memory 1212 via an input/output (I/O) interface 1230. Computing device 1200 further includes a network interface 1240 coupled to I/O interface 1230.

In various embodiments, computing device 1200 may be a uniprocessor system including one processor 1210 or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x126, PowerPC, SPARC, or MIPS ISAs, or any other suitable ISA. In multiprocessor systems, each of processors 1210 may commonly, but not necessarily, implement the same ISA.

System memory 1212 may be configured to store instructions and data accessible by processor(s) 1210. In various embodiments, system memory 1212 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 1212 as code 1225 and data 1226.

In one embodiment, I/O interface 1230 may be configured to coordinate I/O traffic between the processor 1210, system memory 1212, and any peripheral devices in the device, including network interface 1240 or other peripheral interfaces. In some embodiments, I/O interface 1230 may perform any necessary protocol, timing, or other data transformations to convert data signals from one component (e.g., system memory 1212) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components. Also, in some embodiments some or all of the functionality of I/O interface 1230, such as an interface to system memory 1212, may be incorporated directly into processor 1210.

Network interface 1240 may be configured to allow data to be exchanged between computing device 1200 and other device or devices 1260 attached to a network or network(s) 1250, such as other computer systems or devices as illustrated in FIGS. 1 through 4, for example. In various embodiments, network interface 1240 may support communication via any suitable wired or wireless general data networks, such as types of Ethernet networks, for example. Additionally, network interface 1240 may support communication via telecommunications/telephony networks such as analog voice networks or digital fiber communications networks, via storage area networks such as Fibre Channel SANs or via any other suitable type of network and/or protocol.

In some embodiments, system memory 1212 may be one embodiment of a computer-accessible medium configured to store program instructions and data as described above for FIGS. 1-12 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 1200 via I/O interface 1230. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 1200 as system memory 1212 or another type of memory. Further, a computer-accessible medium may include transmission media or signals such as electrical, electromagnetic or digital signals, conveyed via a communication medium such as a network and/or a wireless link, such as may be implemented via network interface 1240. Portions or all of multiple computing devices, such as those illustrated in FIG. 12, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 12, may include other components that are not explicitly shown in FIG. 12, or may utilize an architecture completely different than that shown in FIG. 12.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method for implementing system calls in a virtualized computing environment comprising a plurality of computing devices that are configured to host a plurality of virtual machines, the method comprising:
    instantiating an interface configured to abstract partitions between virtual machines in the virtualized computing environment;
    receiving, by the interface, a system call to be executed in the virtualized computing environment, wherein the system call is configured to be executed across a system boundary of a master-slave architecture of a system deployed in a localized computing environment outside of the virtualized computing environment;
    determining a declarative policy associated with the system call;
    based on the declarative policy, causing execution of the system call in the virtualized computing environment, wherein the system call is executed across the partitions between the virtual machines in the virtualized computing environment; and
    returning a result of the system call.

2. The method according to claim 1, wherein the system call is a I/O control code or I/O request packet.

3. The method according to claim 1, wherein the partitions include a root partition and a guest partition.

4. The method according to claim 1, wherein the system boundary includes a boundary between a user mode and a kernel mode.

5. The method according to claim 1, further comprising negotiating version information across the system boundary.

6. The method according to claim 1, further comprising converting the system call to a machine-to-machine communication in the virtualized computing environment.

7. The method according to claim 1, further comprising converting the system call to a virtual machine-to-virtual machine communication on a single host in the virtualized computing environment.

8. The method according to claim 1, further comprising converting the system call to a host-to-virtual machine communication or a virtual machine-to-host communication on a single host in the virtualized computing environment.

9. The method according to claim 1, further comprising converting the system call to be executable in a single master to multiple slave architecture implemented in the virtualized computing environment.

10. The method according to claim 2, wherein the results include an error code and an output buffer.

11. The method according to claim 1, further comprising converting, by the interface, the system call such that multiple partitions use a single trusted partition for executing the system call in the virtualized computing environment.

12. A system comprising:
    a memory having stored therein computer instructions that, upon execution by a processor of the system, cause the system to perform operations comprising:

instantiate an interface configured to abstract partitions between virtual machines in a virtualized computing environment;

receive, by the interface, a system call to be executed in the virtualized computing environment, wherein the system call is configured to be executed across a system boundary of a controller-enforcer architecture of a local system deployed in a localized computing environment outside of the virtualized computing environment;

cause execution of the system call in the virtualized computing environment based on a declarative policy associated with the system call, wherein the system call is executed across the partitions between the virtual machines; and return a result of the system call.

13. The system of claim 12, wherein the operations further comprise:

convert the system call such that multiple guest partitions use a trusted partition for executing the system call in the virtualized computing environment.

14. The system of claim 13, wherein the trusted partition is a trusted root partition.

15. The system of claim 13, wherein the trusted partition is a trusted guest partition.

16. The system of claim 13, wherein the system call is executed in a trusted service in the trusted partition, wherein the trusted service:

authenticates the call as coming from a trusted guest partition;

validates a message buffer and data applicable to the system call; and executes the system call on behalf of the guest partition.

17. A computer-readable storage medium having computer-executable instructions stored thereupon which, when executed by a processing system of a computing device, cause the computing device to perform operations comprising:

receiving a system call to be executed in a virtualized computing environment, wherein the system call is configured to be executed across a system boundary of a master-slave architecture of a system deployed in a localized computing environment outside of the virtualized computing environment;

determining a declarative policy associated with the system call;

based on the declarative policy, causing execution of the system call across partitions between virtual machines of the virtualized computing environment; and returning a result of the system call.

18. The computer-readable storage medium of claim 17, wherein the system call is a I/O control code or I/O request packet.

19. The computer-readable storage medium of claim 17, further comprising computer-executable instructions stored thereupon which, when executed by the processing system of a computing device, cause the computing device to perform operations comprising converting the system call such that multiple partitions use a single trusted partition for executing the system call in the virtualized computing environment.

20. The computer-readable storage medium of claim 17, wherein the system boundary includes a boundary between a user mode and a kernel mode boundary.

21. A method for implementing system calls in a virtualized computing environment comprising a plurality of computing devices that are configured to host virtual machines, the method comprising:

receiving, via an interface configured to abstract partitions between the virtual machines in the virtualized computing environment, a system call configured to be executed across a system boundary of a master-slave architecture deployed in a localized computing environment;

determining a declarative policy associated with the system call;

based on the declarative policy, causing execution of the system call in the virtualized computing environment, wherein the system call is executed across the partitions between the virtual machines in the virtualized computing environment; and returning a result of the system call.

* * * * *